Nov. 14, 1939.                G. S. ROGERS                2,179,729
                           DISPENSING APPARATUS
                         Filed Sept. 28, 1936
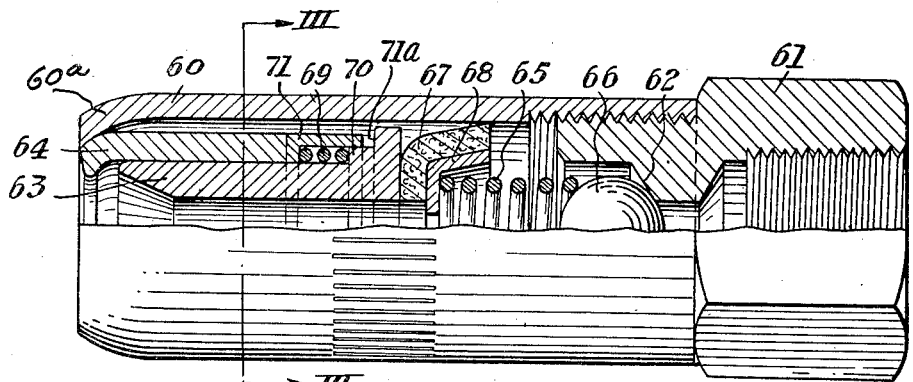
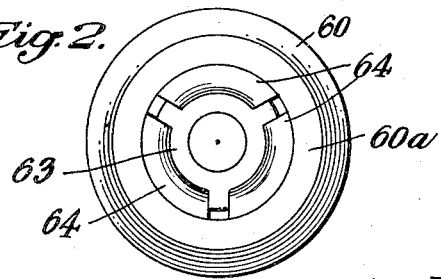
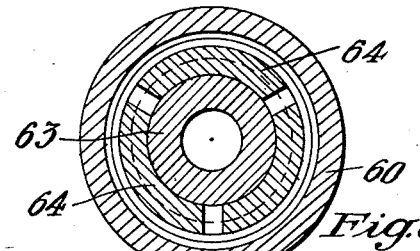
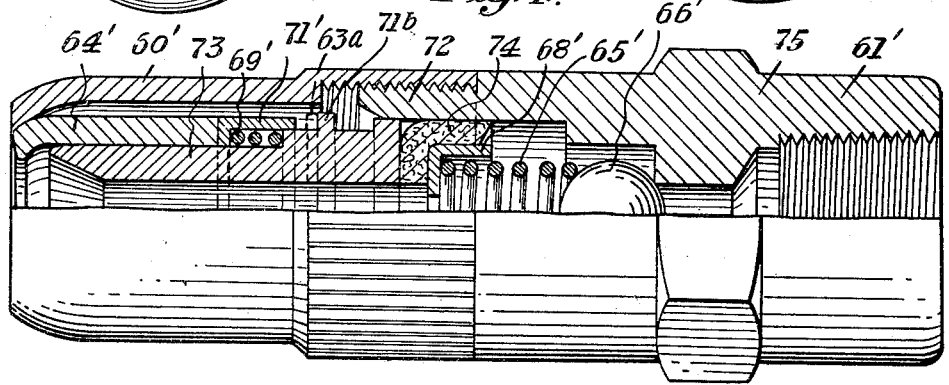
INVENTOR
Gerald S. Rogers Patented Nov. 14, 1939

2,179,729

UNITED STATES PATENT OFFICE 2,179,729

DISPENSING APPARATUS

Gerald S. Rogers, Pittsburgh, Pa., assignor, by mesne assignments, to Christian Brynoldt, Pittsburgh, Pa.

Application September 28, 1936, Serial No. 102,940

4 Claims. (Cl. 285—169)

This invention relates to dispensing apparatus, and particularly to such apparatus which is especially adapted for the handling of lubricant such as grease.

Numerous devices of this kind have been proposed heretofore, and it is an object of the invention to improve upon them by providing apparatus of greater simplicity and effectiveness and of lower cost, than has previously been available. In accordance with the invention, I provide a coupler adapted to be secured to a dispenser, such as a grease gun, for connecting the latter to a fitting having an enlarged head. I provide the coupler with jaws capable of gripping the fitting head. By means of the construction to be described in greater detail hereinafter, I am able to positively attach the coupler to the fitting merely by pressing it thereon. The coupler may be detached from the fitting by bending it relatively thereto. This releases the seal between coupler and fitting and relieves the pressure on the lubricant in the coupler.

For a complete understanding of the invention, reference is made to the accompanying drawing illustrating a preferred embodiment and several modifications. In the drawing, Fig. 1 is a partial longitudinal section through the coupler of my invention;

Fig. 2 is an end view of the coupler;

Fig. 3 is a sectional view along the line III—III of Fig. 1; and

Fig. 4 is a partial sectional view similar to Fig. 1 through a modified form of coupler.

The coupler shown in Figs. 1 through 3 is adapted to be connected to a grease gun for cooperation with a headed fitting. Several suitable types of gun and fitting are already known and require no description. The coupler comprises a tubular nose piece 60 and an adapter 61 threaded thereinto having a valve seat 62 formed therein. The end of the nose piece 60 remote from the seat 25 has an inturned flange 60a. The nose piece may be formed from a tube in a punch press or may be drawn from flat stock. A plunger 63 is reciprocable within the nose piece and has an axial bore therethrough. The outer end of the plunger is concave for sealing engagement with the hemispherical end of a fitting. Gripping jaws 64 are disposed about the plunger adjacent the flanged end of the nose piece, the cooperating surfaces of the nose piece and jaws being so shaped as to cause the jaws to move into gripping engagement with the head of a fitting when moved outwardly of the nose piece. The jaws 64 are backed up by a spring 69 compressed between a shoulder 70 on the plunger 63 and a spring cup 71 slidable on the shoulder and having an inturned flange abutting the inner ends of the jaws. The plunger 63 and the jaws 64 are urged toward the open end of the nose piece by a spring 65 compressed between a ball check valve 66 and a sealing washer 67 having a spring cup 68 therein.

The operation of the structure so far described will probably be apparent from the drawing. As the coupler 11 is pressed onto the fitting, the head of the latter engages the ends of the jaws 64 and presses them into the nose piece 60, compressing the springs 69 and 65. This retraction of the jaws permits them to move radially outward so that the head of the fitting passes by the outer ends of the jaws. The latter are then urged outwardly along and inwardly toward the axis of the nose piece by the spring 65 whereby to grip the fitting head.

When sufficient lubricant has been supplied, as from a gun connected to the adapter 61, it is only necessary to bend the coupler relative to the fitting to disconnect it therefrom. The construction shown permits angular movement between the coupler and fitting to a slight extent, say about 10°. When this has been exceeded, however, one or more of the jaws 64 are forced inwardly of the nose piece, against the force of the springs 65 and 69. This permits the jaws to expand and free the head of the fitting. After initial retraction of the jaws 64, the cup 71 engages a shoulder 71a on the plunger 63 and positively breaks the seal between the outer end of the plunger and the cooperating fitting. This also relieves the pressure on the lubricant within the coupler, to facilitate detachment thereof.

Fig. 4 shows a slight modification of the construction shown in Fig. 1. In Fig. 4, the adapter 61 is elongated as at 72 to slidably receive the inner end of the plunger 73. The sealing washer 74 has peripheral engagement with the bore through the adapter 75 instead of with the inner wall of the nose piece 60, as in Fig. 1. Other parts of the coupler of Fig. 4 are designated by the same numerals as in Fig. 1 with a prime affixed thereto. A washer 63a may be disposed on the plunger 63' if desired, between cup 71' and shoulder 71b.

It will be apparent from the foregoing description that the invention provides dispensing apparatus which represents a material simplification as compared to similar devices known previously. As a result, the apparatus can be manufactured and sold more cheaply. At the same time, tests indicate that the apparatus disclosed is even more effective than previous equipment of the kind in withstanding high pressure without developing leaks.

Although I have illustrated and described herein but a preferred embodiment and a few modifications of the invention, it will be understood that changes in the construction illustrated may be made without departing from the spirit of the invention or the scope of the appended claims.

I claim:

1. A coupler for attaching dispensers to headed fittings comprising a tubular body contracted at one end, radially and axially movable jaws disposed in said end, a plunger having one end within said jaws, adapted to make sealing engagement with a fitting in said jaws, means on said plunger abutting a shoulder thereon for yieldingly urging said jaws toward said contracted end, a washer abutting the end of the plunger remote from said jaws and making sealing contact with the interior of said body, yieldable means backing up said washer, and means on said plunger adapted to be engaged by said jaws on retraction thereof for positively retracting the plunger on retraction of said jaws whereby to break sealing engagement with a fitting.

2. The coupler defined by claim 1 characterized by said first-mentioned yieldable means comprising a coil spring and a cylinder enclosing the spring, said cylinder being slidable on the plunger, abutting said jaws, and adapted to engage said shoulder.

3. A coupler comprising a body, jaws movably carried therein adjacent one end, means for contracting said jaws on movement thereof toward said end, a plunger having one end within said jaws, an outwardly extending shoulder on said plunger adjacent the end remote from the jaws, a spring compressed between said shoulder, an annulus on the plunger adapted to be engaged by said jaws on retraction thereof and to engage a shoulder on said plunger, a washer abutting said last mentioned end of the plunger and making sealing contact with the interior of the body, and a spring urging the washer against the plunger.

4. A coupler comprising a tubular member contracted at one end, gripping jaws carried in said end for engaging a fitting inserted therein, a shouldered plunger reciprocable within said jaws and adapted at its outer end to make sealing engagement with said fitting, means for yieldingly urging said plunger toward the contracted end of said member, a compression spring surrounding said plunger and abutting a shoulder thereon for yieldingly urging said jaws toward the contracted end of said member, and an annulus on said plunger adapted to be engaged by said jaws on retraction thereof, and to engage a shoulder on said plunger.

GERALD S. ROGERS.